(12) United States Patent
Ahern et al.

(10) Patent No.: US 12,175,421 B1
(45) Date of Patent: Dec. 24, 2024

(54) SYSTEM AND METHOD FOR ASSET INVENTORY AND URGENT RESUPPLY

(71) Applicant: Government of the United States, as represented by the Secretary of the Air Force, Wright-Patterson AFB, OH (US)

(72) Inventors: Austin Ahern, Albuquerque, NM (US); Eric Dittman, Colorado Springs, CO (US); Michael Anderson, Colorado Springs, CO (US); Acierto Cabigas, III, Newport News, VA (US); Ashton Barnes, Colorado Springs, CO (US); Elliott Weiler, Newport News, VA (US); David Rochester, Yokota Air Base (JP)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 526 days.

(21) Appl. No.: 17/483,862

(22) Filed: Sep. 24, 2021

(51) Int. Cl.
| | |
|---|---|
| *G06Q 10/087* | (2023.01) |
| *F42B 12/02* | (2006.01) |

(Continued)

(52) U.S. Cl.
CPC ........... *G06Q 10/087* (2013.01); *F42B 12/02* (2013.01); *F42B 12/58* (2013.01); *F42B 15/08* (2013.01);

(Continued)

(58) Field of Classification Search
CPC ....... G06Q 10/087; F24B 12/02; F24B 12/58; F24B 15/08; G16Y 20/30; G16Y 40/35; H04L 67/12

(Continued)

(56) References Cited

U.S. PATENT DOCUMENTS

| | | | |
|---|---|---|---|
| 4,619,615 | A | 10/1986 | Kratzenberg |
| 5,305,199 | A | 4/1994 | LoBiondo et al. |

(Continued)

FOREIGN PATENT DOCUMENTS

| | | |
|---|---|---|
| EP | 0846440 A2 | 10/1998 |
| WO | WO2006119345 A2 | 9/2006 |

OTHER PUBLICATIONS

Rogers, Matthew Byrne. A Logistic Planning System for Contingency Missions to Identify a Feasible and Efficient Logistical Footprint. North Carolina State University ProQuest Dissertations Publishing, 2016. (Year: 2016).*

(Continued)

*Primary Examiner* — Florian M Zeender
*Assistant Examiner* — Fawaad Haider
(74) *Attorney, Agent, or Firm* — AFMCLO/JAZ; Jeffrey V. Bamber (57) ABSTRACT

A system for asset inventory and resupply for supplying individuals in remote locations is disclosed. The individuals may be people and/or machines. The system and method involve providing multiple individuals in the field with sensors that automatically collect data on the expenditure of their supplies. In some cases, wearable sensors are provided to people in the field. The data is sent to a central depository which tracks their inventory of supplies and anticipates needed supplies, compiles and packages additional supplies so that the additional supplies can be delivered to the individuals in the field. A precision supply delivery system is provided for delivering the supplies.

13 Claims, 5 Drawing Sheets

(51) Int. Cl.
*F42B 12/58* (2006.01)
*F42B 15/08* (2006.01)
*G16Y 20/30* (2020.01)
*G16Y 40/35* (2020.01)
*H04L 67/12* (2022.01)

(52) U.S. Cl.
CPC .............. *G16Y 20/30* (2020.01); *G16Y 40/35* (2020.01); *H04L 67/12* (2013.01)

(58) Field of Classification Search
USPC ......................................................... 705/28
See application file for complete search history.

(56) References Cited

U.S. PATENT DOCUMENTS

| | | |
|---|---|---|
| 5,455,868 A | 10/1995 | Sergent et al. |
| 5,684,267 A | 11/1997 | Dean |
| 5,973,998 A | 10/1999 | Showen et al. |
| 7,360,489 B1 | 4/2008 | Han et al. |
| 8,036,065 B2 | 10/2011 | Baxter et al. |
| 8,571,815 B2 | 10/2013 | Bar-David et al. |
| 8,826,575 B2 | 9/2014 | Ufer et al. |
| 10,054,576 B2 | 8/2018 | Overcast |
| 10,401,380 B2 | 9/2019 | Loeffler |
| 2002/0003470 A1 | 1/2002 | Auerbach |
| 2003/0061753 A1 | 4/2003 | Glock |
| 2005/0021425 A1 | 1/2005 | Casey |
| 2005/0237186 A1 | 10/2005 | Fisher et al. |
| 2006/0096144 A1 | 5/2006 | Delgado Acarreta |
| 2007/0055586 A1 | 3/2007 | Lucas |
| 2008/0016744 A1 | 1/2008 | Joannes et al. |
| 2015/0338436 A1 | 11/2015 | Loeffler |
| 2020/0355456 A1* | 11/2020 | Deng ..................... H04N 23/66 |

OTHER PUBLICATIONS

Ahern, Austin, Acierto Cabigas, Ashton Barnes, Eric Dittman, Michael L. Anderson, and Elliott Weiler, "Airborne Just in Time Resupply in Austere Environments" published in AIAA Scitech 2021 Forum, p. 0711, Jan. 7, 2021.

Leprince-Ringuet, Daphne, This Swarm of Flying, Sailing, Diving Drones is a Military First. Not Everyone is Happy About It, Jul. 21, 2021, published on the internet.

* cited by examiner

SYSTEM AND METHOD FOR ASSET INVENTORY AND URGENT RESUPPLY

RIGHTS OF THE GOVERNMENT

The invention described herein may be manufactured and used by or for the Government of the United States for all governmental purposes without the payment of any royalty.

FIELD OF THE INVENTION

The present invention relates generally to systems and methods for asset inventory and resupply and, more particularly, to systems and methods for asset inventory and resupply for supplying people and/or machines in remote locations. A precision supply delivery system is also provided.

BACKGROUND OF THE INVENTION

Teams of people conducting missions in austere environments away from a forward operating base (FOB) occasionally have difficulty receiving mission-critical supplies. These teams are often expected to operate with a minimal logistics "tail". In such scenarios, the operators may only bring limited supplies-those that the team can carry with them—as they often traverse large distances to complete their objectives. This includes special operations combat teams, which are typically composed of 5-15 members, and may also apply to other related scenarios, such as remote wildland firefighting teams, search and rescue teams, exploratory/recreational expeditions (such as mountain climbers), as well as machines (e.g., autonomous robots) operating remotely, and the like. A system that provides essential supplies, such as ammunition, batteries, medical supplies, food, and water in sufficient quantity to extend the team's chances of mission success and survival for 24-48 hours would have tremendous utility.

One of the current resupply delivery systems for U.S. Armed Forces, the "Joint Precision Airdrop System (JPADS) ", utilizes crates to deliver supplies to troops. These crates are pushed out of aircraft, specifically C-130's and C-17's, and can carry a load varying from 500 lbs. to 10,000 lbs. This system is extremely diverse in terms of the quantity of supplies which can be delivered. However, multiple problems have been identified with the current system. Items within shipments are often damaged due to impact with the ground, and inclement weather limits the accuracy of crate delivery. The crates are hard to control or guide, so in adverse terrain, such as mountains, the crates often land in distant and hard-to-access areas. Also, delivery time is highly variable due to the multi-step process involved. For example, a request is submitted, the supplies are gathered, a pallet is created, an aircraft is loaded, and then dispatched to deliver the pallet. Aircraft unavailability, threats, and adverse weather conditions can delay resupply missions which threatens the effectiveness and safety of the forward operating units. These air drops are also wasteful because supplies are delivered as 500 lb. pallets, which may far exceed the needs of the remote operators. When excess supplies are delivered in combat scenarios, they must be explosively destroyed by the operators, or burned, which announces the presence of the operators to hostile forces and is a time-consuming process that leaves the team vulnerable to attack.

A need, therefore, exists for improved systems and methods for resupplying people and/or machines in remote locations. In particular, a need exists for a system that is easily interoperable with existing systems, provides adequate standoff distance, ensures supply security, and provides for timely and accurate delivery to the operators.

SUMMARY OF THE INVENTION

The present invention relates generally to systems and methods for asset inventory and resupply and, more particularly, to systems and methods for asset inventory and resupply for supplying people and/or machines in remote locations. A precision supply delivery system is also provided.

While the invention will be described in connection with certain embodiments, it will be understood that the invention is not limited to these embodiments. To the contrary, this invention includes all alternatives, modifications, and equivalents as may be included within the spirit and scope of the present invention.

In one embodiment, a system for asset inventory and resupply for supplying a group of individuals is provided. The term "individuals" includes people and/or machines. The system comprises:

a plurality of sensors, each of which is configured to be associated with an individual, which sensors are configured to collect data that relate to the expenditure of supplies by the group of individuals;

a portable computing and communication device ("communication device") for collecting sensor data in the locality of the sensors, wherein the portable communication device is communication with the sensors, and the communication device is also in communication with a processor;

a processor that may be located at a base distant from the portable communication device, wherein at least one of the portable computing and communication device and the processor: tracks the expenditures of supply by the group of individuals; determines the group's remaining inventory of supplies; and predicts the future supply needs based on the group's rate of inventory consumption; and     a precision supply delivery system for delivering supplies to the group of individuals.

A method for asset inventory and resupply for supplying a group of individuals in the field is also provided. The method may comprise:

providing a group of individuals in the field with sensors configured to collect data that relate to the expenditure of supplies;

providing a portable computing and communication device for collecting sensor data in the locality of the sensors, wherein the portable communication device is in communication with the sensors, and the communication device is also in communication with a processor at a base;

collecting sensor data in the locality of the sensors using the portable computing and communication device;

providing a processor at a base distant from the portable communication device;

tracking the expenditures of supply by the group of individuals using at least one of the portable computing and communication device and the processor;

determining the group's remaining inventory of supplies using at least one of the portable computing and communication device and the processor;

predicting the future supply needs based on the group's rate of inventory consumption using at least one of the portable computing and communication device and the processor; and using a precision supply delivery system to deliver the supplies to the group of individuals in the field.

A precision supply delivery system is provided that is also an invention in its own right. The delivery system may comprise an inert missile configured for delivering supplies. The missile may comprise: a missile body having a longitudinal centerline, an interior, an interior space for a payload, and interior walls that define the interior space; and at least one packing insert that is located in the interior space of the missile body. The packing insert(s) are configured to fit into the interior space. The packing insert has at least one receptacle therein for holding a supply item.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to systems and methods for asset inventory and resupply and, more particularly, to systems and methods for asset inventory and resupply for supplying people and/or machines operating in remote locations. A precision supply delivery system is also provided.

The term "individuals", as used herein, may refer to people and/or machines (e.g., autonomous robots). The people in remote locations (or in "the field") may be referred to herein as "operators" in the sense that they are carrying out an operation.

The system for asset inventory and resupply is a combination of components and methods that addresses an urgent need for effective means to resupply, in some embodiments, remotely operating teams. It does so by detecting expenditure of supplies, tracking usage, predicting future resupply needs and notifying support agents so they can prepare timely resupply packages. The system may include a plurality of sensors, which may comprise a suite of wearable sensors, to detect the expenditure of supplies, such as ammunition, batteries, medical supplies, food, and water. Optionally, sensors may be provided that monitor the operator's vital signs including heart rate, temperature, etc. These metrics are sent to a portable computing and communication device to collect sensor data, compile it, and send it to a processor at a forward operating base. At least one of the portable computing and communication device and the processor: tracks the expenditures of supply by the group of individuals: determines the group's remaining inventory of supplies; and predicts the future supply needs based on the group's rate of inventory consumption. It may also evaluate each operator's health and recommend nutrition or medical supplies. These supplies are loaded by support personnel onto a precision delivery system to rapidly deliver the replacement supplies. The delivery system may be a guided missile with the energetic warhead removed and replaced with one or more inserts to safely transport the supplies.

Figure 1:
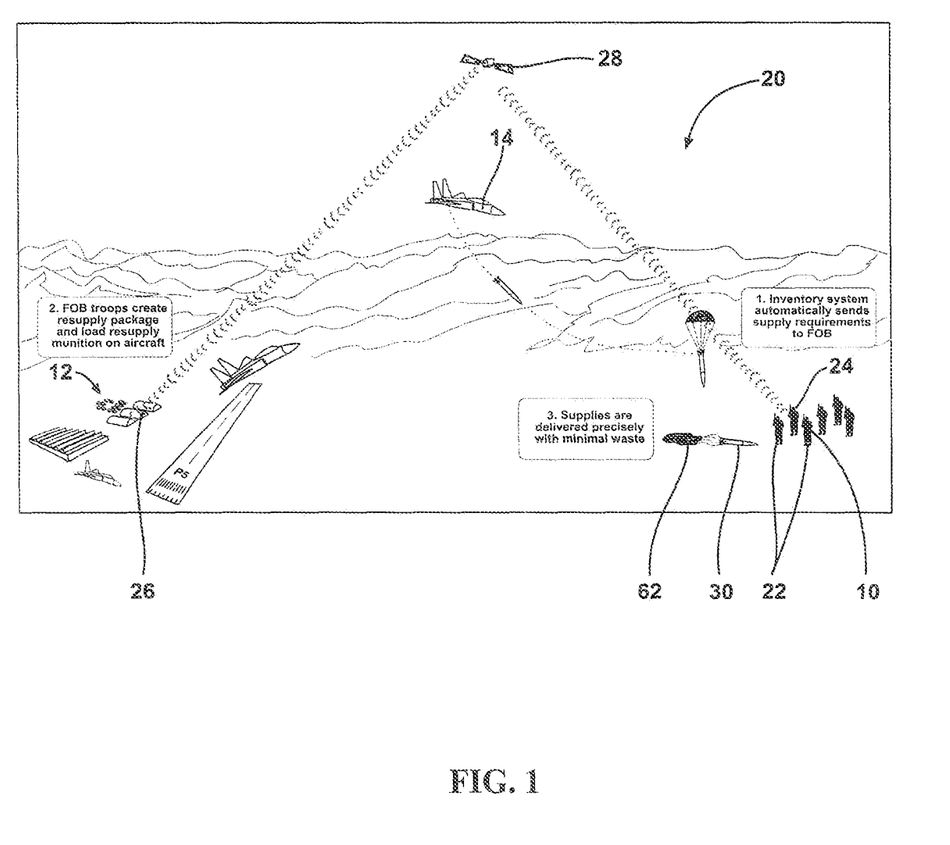
FIG. 1 is a schematic perspective view of the overall system for asset inventory and resupply.

FIG. 1 shows one embodiment in which the system and method are being used in the field with a plurality of operators 10 operating remotely from a base 12. The term "base", as used herein, can comprise any suitable location or facility that is separated by a distance from the location of the operators. The distance can be any increment of 1 mile or more from the operators. The system is most useful when the base is located a distance away from individuals in the field such that there are no direct over-the-road supply lines therebetween, or in which there is a contested or hostile environment that prevents over-the-road resupply because of enemy threats.

Figure 2:
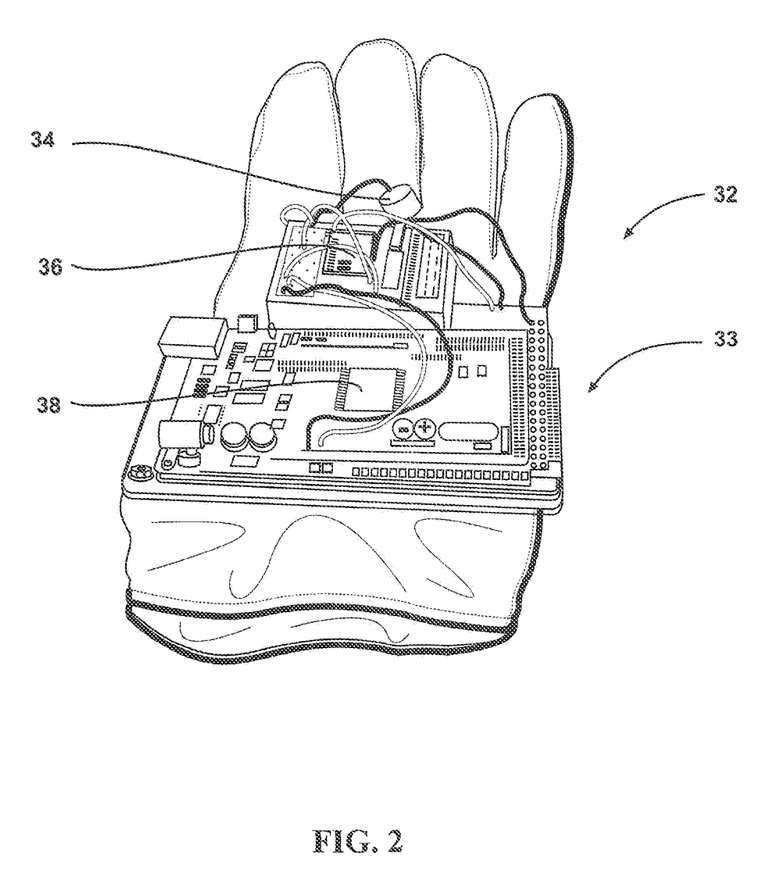
FIG. 2 is a perspective view of a gunshot detection device provided on a glove.

FIGS. 1 and 2 show an embodiment of the system 20 that generally comprises: a plurality of sensors 22 (one of which is shown in detail in FIG. 2) to detect the expenditure of supplies by a group of individuals: a portable computing and communication device ("communication device") 24 to collect sensor data, compile it and forward it to a processor 26, such as via a satellite 28; and, a processor 26 that may be located at a base distant from the portable communication device. At least one of the communication device 24 and the processor 26 tracks expenditures, inventory and predicts future needs based on "burn rates". A precision delivery system (such as a re-purposed guided missile 30 with specialized packing inserts delivered from an aircraft 14) is provided to rapidly deliver the replacement supplies to the operators 10.

Sensors to Detect Supply Expenditures and Supply Needs

The system 20 utilizes at least one sensor 22 that is associated with the individual operators and/or machines in the field. The term "associated with", as used herein with respect to the sensors means that a sensor functions to determine the supply expenditures and/or supply needs of a particular individual (e.g., operator or machine). The sensor 22 may be carried by or worn by the operator. In the case of machines, the sensor 22 may be in communication with the machine and/or joined to the machine. The system 20 will typically comprise a plurality of sensors 22, in which individual sensors are assigned to different operators and/or machines. The sensors 22 are utilized to determine the supply expenditures of a particular operator or machine with which it is associated. The system will receive input from the sensor(s) 22 and will resupply the group of individuals.

The sensors 22 can comprise any suitable type of sensor. The sensors 22 can be used to determine the expenditures of various types of supplies including, but not limited to: ammunition, batteries, medical supplies, food, and water. The sensors 22 can also be used to monitor vital signs of each operator to track the operator's need for medical supplies and/or to track the operator's movement to estimate the operator's need for additional food and water.

In certain embodiments, the operators may be provided with one or more wearable sensors. The wearable sensors may be joined to an item or wearable article that is located on any suitable part of the operator's body. The wearable sensors can be mounted on the wearer's wrist, waist, ankle, or other body parts. In some embodiments, the wearable article may comprise an enhanced wrist-watch or glove. If an operator or machine is provided with multiple sensors, these may be referred to herein as a "suite" of sensors.

In the case of military operators, the sensors 22 can be used to track the expenditure of supply items including ammunition. Various types of sensors for detecting the expenditure of ammunition can be used. These include microphones and accelerometers for gunshot detection and characterization. Various types of microphones and accelerometers may be used (Micro Electro-Mechanical Systems (MEMS)-based, piezo-electric, magnetic, piezoresistive, crystal, etc.). Other sensors, in addition to microphones and accelerometers may be used for gunshot detection, such as force, velocity and/or position sensors. Heat and pressure sensors may also be effective at detecting gunshots. Electro-optical cameras with computer vision algorithms can also perform this function.

FIG. 2 shows one embodiment of a wearable article in the form of a glove 32 that comprises a round-counting sensor system 33. The sensor system 33 comprises a microphone 34, an accelerometer 36, and a microcontroller board 38. In such embodiments of the wearable article, a microphone and an accelerometer are used to count discharged rounds and thereby track the remaining ammunition supply of each operator.

The microphone 34 picks up sounds of gunshots. It has been found that specific sounds create a repeatable frequency domain signature that can be used to identify various types of ammunition. These profiles can be collected with the hardware described herein. The sound profiles can be used to produce a library of expected sound profiles that the software can reference to identify expended ammunition. Prior calibration is performed to map acceleration and sound profiles associated with each type of round-weapon pair. Such techniques are described in U.S. Pat. No. 5,455,868, Sergent, et al. These pre-mapped "signatures" will enable the system to distinguish discharges between ammunition types and predict future supply needs.

The accelerometer 36 is used because gunshots produce sudden acceleration spikes that are distinguishable from the environmental and situational accelerations experienced by users. When both acceleration and audio spikes are detected within a set time frame, the system will register that a gunshot has been fired.

In addition, it is possible to estimate barrel length of the weapon being discharged using time of arrival based on the delay between the sound event and the acceleration event. The recoil of the weapon discharge will create an acceleration event that is near-instantaneous, while the gunshot sound will reach the sensor after a small, but significant, delay. This can be used to supplement and improve ammunition caliber determination, beyond the previously mentioned sound profile signatures. For example, the distance from the barrel of an M4 carbine and M9 rifle to the wrist of the user is 0.50 m and 0.258 m, respectively, corresponding to times of arrival of 1.47 ms and 0.75 ms, respectively. These varying delays in recording acceleration and sound can be used to identify the type of round that was expended.

FIG. 2 shows an embodiment in which microphone 34 and an accelerometer 36 are built into a glove 32 worn by the operator, and connected to an ARDUINO®-based microcontroller 38. In use, sound is collected by the microphone 34 in real-time and decomposed with an ARDUINO®-based Fast Fourier Transform (FFT) to obtain its frequency spectrum which can be compared to a database of known rounds that correspond to the various firearms employed by the operators. Furthermore, a decibel threshold is used to distinguish rounds fired from the user's firearm versus the firearm of a teammate or other combatant firing nearby (a gunshot typically produces a sound with a spike above 170 dB). The sensor system 33 shown in FIG. 2 can be ruggedized and miniaturized.

It should be understood that while round-counting attachments for firearms are currently available, in many cases, military operators strongly oppose direct modifications to their firearms, such as round-counting attachments. Therefore, while such round-counting firearm attachments could be used with the other components of the present system, they may be less desirable in comparison to a sensor system that is worn by the operator, and does not require any modification to their firearms. Round-counting attachments may also be useful for weapons other than firearms. Such weapons include, but are not limited to grenade launchers and mortars. Round-counting attachments to these weapons can also be used to communicate with the other components of the present system.

In addition to ammunition sensors, biological health sensors can be used to monitor vital signs of each operator for the purposes described herein. Such sensors may include, but are not limited to sensors that measure: heart rate, body temperature, respiration rate, oxygen consumption, galvanic skin response (skin conductivity, which indicates sweat), and movement.

For monitoring vital signs, various sensors can be used. Heart rate and EKG can be measured using various types of sensors including, but not limited to embedded textile electrodes (with or without conductive gel), pressure sensors using piezoelectric, piezoresistive, or polyvinylidene fluoride (PVDF) transducers, or capacitive electrode sensors. Body temperature can be measured using various types of sensors including, but not limited to digital thermometers, thermistors, infra-red, or various integrated circuit thermometers (LM35, EM4325). For example, body temperature can be measured by a negative temperature coefficient resistor sewn into the operator's clothing with flexible wires used to transmit the signals to a central collection unit. A pulse oximeter can be used to measure oxygen saturation, a low level of which indicates high physical exertion. Galvanic skin response can be measured by any means of measuring resistance across a substrate, which includes a voltage source and current measurement integrated circuit. Galvanic skin response can, for example, be measured by a sensor system worn on the operator's wrist that measures resistance across the skin through two small electrodes. All of the sensors can incorporate Bluetooth or similar wireless transmission to the central portable computing device 24.

The data from these sensors may not only provide information on the operator's health and well-being, but may also indicate if the operator is engaged in heavy exertion and/or in a stressful situation, such as direct combat. Such sensors may also indicate if the operator has been injured and the nature of the injury. Indications such as low pulse and lowered temperature would indicate loss of blood and the operator experiencing shock. These data can be used to initiate the delivery of critical medical supplies such as blood, medicine and bandages.

General activity can be monitored with various types of sensors (accelerometers, gyroscopes, magnetometers, pressure sensors, GPS), using various transducer modalities (magnetic, piezoresistive, piezo-electric, crystal, etc.). Movement activity sensors, including Micro Electro-Mechanical Systems (MEMS) accelerometers, magnetometers (compass), and GPS receivers can be used to track the operator's activity such as rate of speed, steps taken, elevation gain and total distance travelled in order to estimate individual physical exertion. These estimates can be used to estimate the need for additional food and water, or otherwise provide situational awareness to the FOB of the operational team's activities.

The Portable Computing and Communication Device

The portable computing and communication device 24 can be any suitable type of device that is capable of being placed in communication with the sensors 22 and carrying out the tasks described herein. The portable computing and communication device 24 receives data from the sensors 22, and transmits the data to a processor 26 which may be located at a base 12 that is distant from the portable computing and communication device 24. The portable computing and communication device 24 may have computational power to process incoming data and turn it into meaningful, actionable information. In some cases, the portable computing and communication device 24 is a "digital signal processor", which is a type of microcontroller device that does simple computing. In other cases, the portable computing and communication device 24 is a more powerful device that can execute more advanced algorithms. Sensor data, such as ammunition expenditures and biometric data may not only be transmitted, but may also be recorded by the portable computing and communication device 24.

A variety of means might be used to collect, condition, and store sensor outputs. Numerous combinations of both wired and wireless means are possible for collecting sensor outputs, depending on the location of the sensor(s) 22 relative to the central collection device 24 and the personal preferences of the user. Commonly available wireless options include BLUETOOTH®, Zigbee, and wireless Ethernet. Other unique means of transmission might be possible including fiber optic cable or other radio-frequency transmission at different frequencies. Microcontrollers will be needed for some sensors to condition the sensor signals, which could be ARDUINO®-based controllers, such as the wearable "Lilypad". The ARDUINO® ESP 8266 is a compact and lightweight microcontroller with wireless capability that could be used for some sensors.

The sensor data may be collected by a central computing device (the portable computing and communication device 24) that is associated with (e.g., carried by) one of the operators. In some embodiments, the portable computing and communication device 24 may be an ANDROID™ Tactical Assault Kit (ATAK), which is commonly used by operators in the field for navigation, targeting aerial strikes, and communication. The ATAK is similar to an ANDROID™ "smart phone" and is capable of tracking the team's location, as well as aerial-resupply deliveries. It comes equipped with numerous sensors and long-range wireless communication. Other similar devices might be used, such as any number of equivalent smart phones (available from manufacturers such as Samsung, LG, Google, Apple, Blackberry). The latter devices would need to be ruggedized and configured for secure communication.

The Processor

The live data from the portable computing and communication device 24 may be forwarded to a processor 26 that is monitored by support elements or personnel at the forward operating base (FOB) 12, or at another location. Personnel at the base 12 may prepare appropriate resupply packages for the forward operator(s) and communicate the proposed resupply package and drop location to the forward operator(s). The forward operator(s) may then accept the proposed resupply package and drop location, or make adjustments. This technology and tactical approach will allow for more timely and accurate resupplies.

The Delivery System

The delivery system can be any suitable type of system that is capable of timely and accurately delivering the supplies to the group of individuals e.g., the forward operator(s). The delivery system desirably provides adequate standoff distance, ensures supply security, and provides for timely and accurate delivery to the operators.

Figure 3:
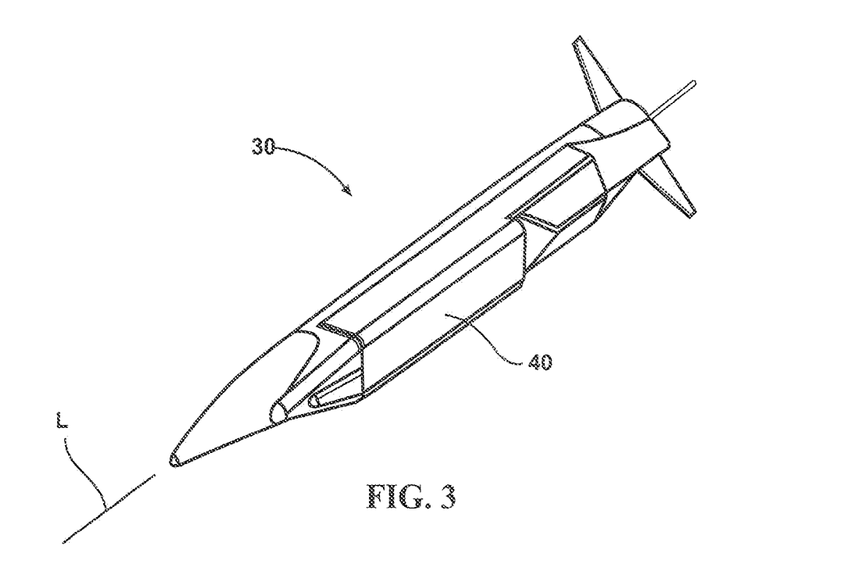
FIG. 3 is a perspective view of one embodiment of an inert air-to-ground munition that can serve as a delivery device for the supplies.

In the resupply system 20 shown in the drawings, the delivery system 30 comprises an inert precision guided missile (that is, a missile with the warhead removed). The missile 30 can be any suitable type of missile including, but not limited to: ground-launched or ship-launched, or air-to-ground (AGM). In the embodiment shown in the drawings, the missile is an air-to-ground missile. Many different air-to-ground missiles can be used including, but not limited to: a GBU-39A missile; the 500-lb Joint Direct Attack Munition (JDAM) variants (GBU38, GBU-12, BLU-129); and the 2000-lb JDAM variants (GBU-10, GBU-24). The latter missiles are larger than the GBU-39A and are able to transport more supplies, but there are fewer aircraft that can transport and deliver these larger missiles. Another option is a delivery system launched from the Systima Systems' Common Launch Tube, such as the Raytheon Griffin missile. The Common Launch Tube is familiar to U.S. Special Operations forces and is already integrated into numerous U.S. Air Force Special Operations Command (AFSOC) aircraft and Department of Defense (DoD) helicopters.

Figure 8:
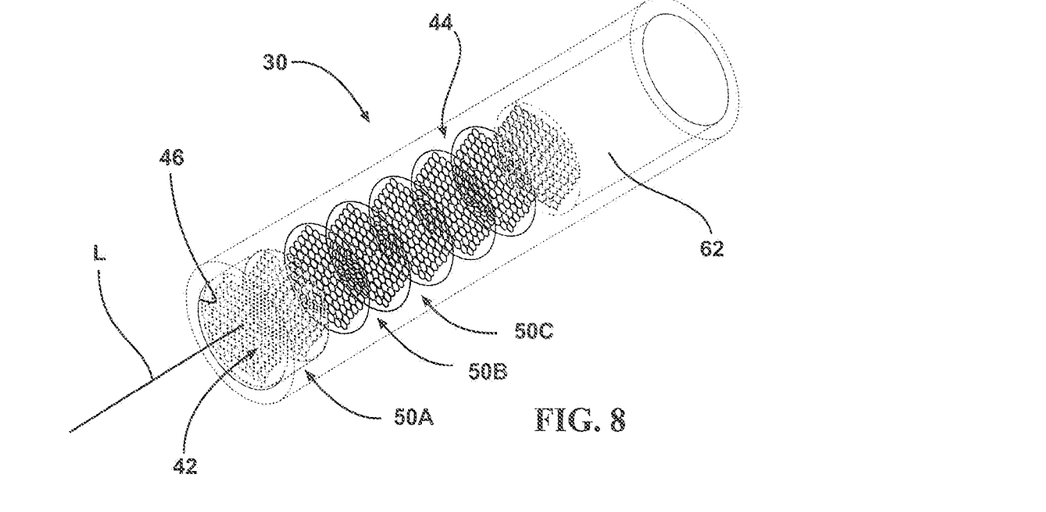
FIG. 8 is a perspective view showing one arrangement of packing inserts and a parachute container in the interior of a payload bay of the delivery device.

In the embodiment shown in FIG. 3, an inert GBU-39A missile 30 is used as the munition to use for resupply due to its current use with Air Force aircraft and its available space for payload (after the explosive warhead is removed). The missile 30 may comprise: a missile body (or shell) 40 having a longitudinal centerline L. As shown in FIG. 8, the missile 30 comprises an interior 42, an interior space 44 for a payload, and interior walls 46 that define the interior space. The supplies are located in the interior space 44, and are contained in packing inserts designated generally by reference number 50, as specifically as 50A, 50B, 50C, etc.

The following are several examples of configurations and methods that are proposed to best utilize the available payload space and safely deliver the supply items.

The delivery system may comprise one or more packing inserts 50 that are configured to fit inside the missile payload bay 44 to optimally transport the needed supplies. The packable volume will be that formerly occupied by the energetic warhead and fusing systems which, in the case of the GBU-39A missile, is 395 cubic inches and 97 lbs. Based on user requirements, there are four different types of ammunition likely needed for resupply: 5.56×45 by NATO, 7.62×51 by NATO, 9×19 mm, and .45 ACP (Automatic Colt Pistol). Other substances such as water and medical supplies can be packed in the remaining space. The inserts 50 are designed in concert with iterative spatial CAD analysis to maximize volumetric efficiency.

Figure 4:
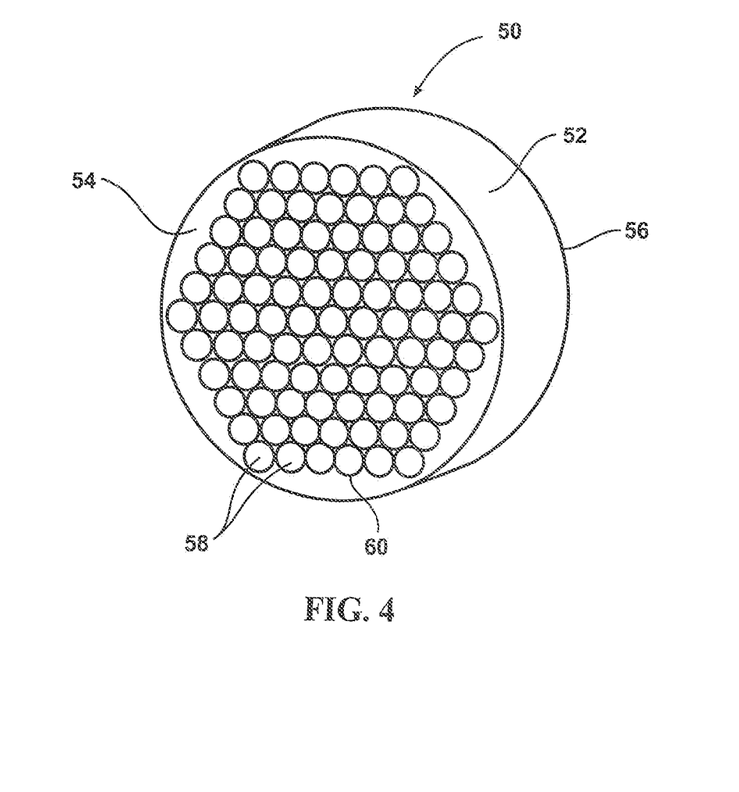
FIG. 4 is a perspective view of one embodiment of a packing ring for ammunition.
Figure 5A:
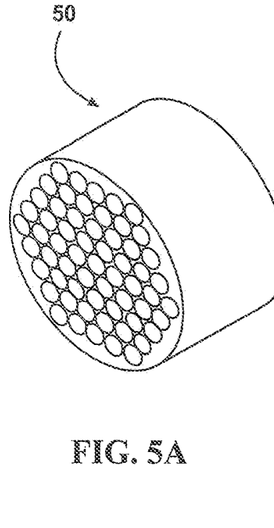
FIG. 5A is a perspective view of another embodiment of a packing ring for ammunition.
Figure 5B:
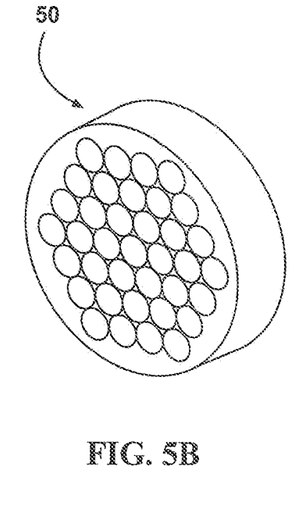
FIG. 5B is a perspective view of another embodiment of a packing ring for ammunition.
Figure 5C:
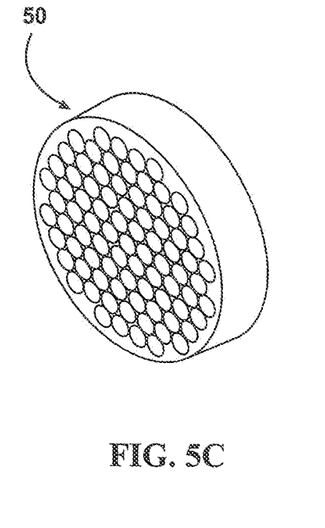
FIG. 5C is a perspective view of another embodiment of a packing ring for ammunition.

FIG. 4 depicts one such insert 50 in which 109 rounds of 5.56 ammunition can fit within the missile cross section. The thickness of this ring is the length of the round (2.26 inches). If only 5.56 ammunition is transported, up to 10 such rings can fit in the payload bay, for a total of 1090 rounds. FIG. 5A depicts an insert for 7.62×51 ammunition. FIG. 5B depicts an insert for 0.45 ACP ammunition, and FIG. 5C depicts an insert for 9 mm (9×19) ammunition. Table 1 shows the final capacity for each type of ammunition insert.

TABLE 1

Ammunition Packing Specifications for GBU-39A Payload Bay

| Ammunition Type | Max rounds per insert ring | Height of insert ring | Maximum inserts in missile payload bay | Total rounds per GBU-39A missile |
|---|---|---|---|---|
| 5.56 × 45 | 109 | 2.26 | 10.62 | 1090 |
| 9 × 19 | 97 | 1.05 | 22.84 | 2134 |

TABLE 1-continued

Ammunition Packing Specifications for GBU-39A Payload Bay

| Ammunition Type | Max rounds per insert ring | Height of insert ring | Maximum inserts in missile payload bay | Total rounds per GBU-39A missile |
|---|---|---|---|---|
| .45 ACP | 43 | 1.28 | 18.82 | 774 |
| 7.62 × 51 | 60 | 2.80 | 8.57 | 480 |

The mass of the packing inserts 50 may be taken into account to ensure that the missile 30 retains its weight and balance properties for a stable flight. Specifically, to ensure minimal changes in the mass and flight properties of the missile 30, it is desirable to select a material for the packing inserts 50 that has a density which creates ballast similar to that of the armed missile. It is also desirable to select a material that is readily available and relatively inexpensive. Suitable materials include, but are not limited to aluminum and tungsten. Aluminum has a density which creates ballast close to that of the armed missile, plus it is readily available. Tungsten is a more dense material (higher specific gravity than aluminum) that is not cost-prohibitive which would be suitable for transporting cargo that is not dense.

Figure 6A:
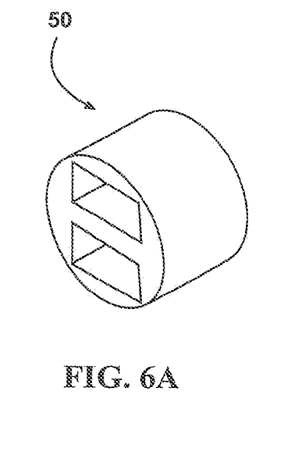
FIG. 6A is a perspective view of one embodiment of a packing ring for radio batteries.
Figure 6B:
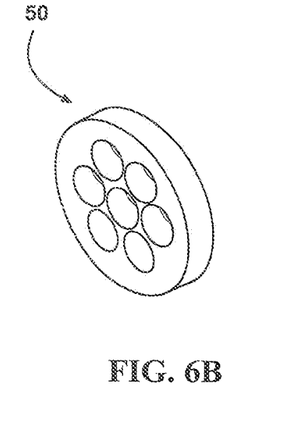
FIG. 6B is a perspective view of another embodiment of a packing ring for batteries.
Figure 7A:
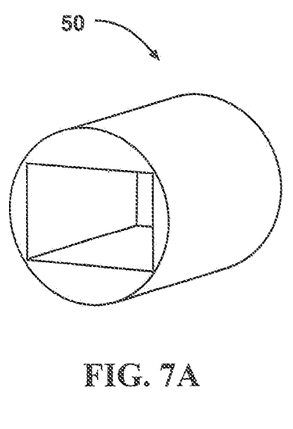
FIG. 7A is a perspective view of one embodiment of a packing ring for a combat tourniquet.
Figure 7B:
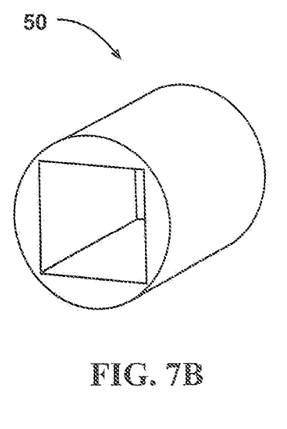
FIG. 7B is a perspective view of one embodiment of a packing ring for an Israeli bandage.
Figure 7C:
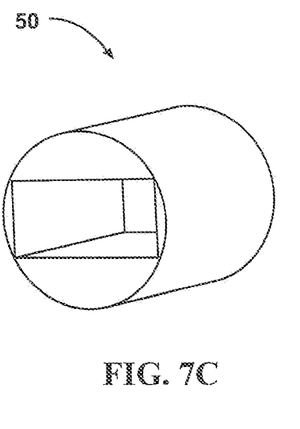
FIG. 7C is a perspective view of one embodiment of a packing ring for combat gauze.

Packing inserts 50 for transporting operationally relevant batteries and medical supplies are shown in FIGS. 6A and 6B and 7A-C. FIG. 6A shows a packing insert for a PRC 152 radio battery. FIG. 6B shows a BA 5567 battery packing insert. FIG. 7A shows an insert for a combat tourniquet. FIG. 7B shows an insert for an Israeli bandage. FIG. 7C shows an insert for combat gauze.

Table 2 provides dimensions for three proposed battery packing inserts. Table 3 provides dimensions for three proposed medical supply inserts. To transport blood, any blood bag may be used, such as the commonly used "Bloodboxx" tactical bags. The blood transport insert has a ½ inch thick insulating layer of high density EPA foam to protect it from excessive heat. In some cases the blood transport insert is made out of tungsten to provide additional ballast for missile weight and balance considerations. Critical medicines can be transported in the battery or blood packing inserts.

TABLE 2

Dimensions for Battery Packing Inserts

| Battery Type | Usage | Length | Width | Height | Radius | Number of Batteries per ring | Thickness of ring | Batteries per tube | Weight per Battery | Total Battery Weight |
|---|---|---|---|---|---|---|---|---|---|---|
| BA5590 | PRC 117G Radio | 4.97 | 2.43 | 4.37 | N/A | 0 | — | — | — | — |
| ELI 152 | PRC-152 Radio | 3.35 | 1.34 | 2.76 | N/A | 2 | 3.35 | 14 | 0.77 | 10.8 |
| BA55674 | Night vision/lasers | N/A | N/A | 0.7 | 1 | 7 | 0.7 | 238 | 0.1 | 23.8 |

TABLE 3

Dimensions for Medical Supply Inserts

| Type of Medical Supply | Width | Length | Height | Unit Surface Area 1 | Unit Surface Area 2 | Unit Surface Area 3 | Unit per ring | Volume per Unit | Max units in tube |
|---|---|---|---|---|---|---|---|---|---|
| Tourniquet | 1.25 | 5.75 | 2.5 | 7.2 | 3.1 | 14.3 | 2 | 18 | 21 |
| Israeli Bandage | 6 | 1 | 3 | 6 | 18 | 3 | 3 | 18 | 21 |
| Gauze | 4 | 1 | 6 | 4 | 24 | 6 | 2 | 24 | 16 |

All dimensions in the tables are in inches, or square inches in the case of areas. Weights are in lbs.

An optional parachute 62 may be provided to slow the descent of the missile 30 and prevent damage to the contents. Given the expected transport velocity and allowable impact velocities, a circular chute not less than 15 feet in diameter may be desirable. Alternative designs (larger or smaller missiles, or other transport vehicles) will require different size chutes. In other cases, certain payloads might not be sensitive to high acceleration, and may not need the use of a parachute. Alternatively, instead of a parachute, aggressive aerodynamic maneuvers, or retro-firing rockets may be used to reduce the impact force of the landing.

Several methods for finding the resupply package after delivery are possible. Operators often are deployed in harsh terrain where communication is unreliable, especially in mountainous terrain, and operators often struggle to locate supply drops. A redundant system is proposed here, but the delivering supplies with a precision-guided missile will greatly reduce the landing site variability, making this system inherently easier to locate. With prior coordination, the team will be able to specify precise locations for their resupply to be dropped, and can expect it to fall very near that location. The delivery missile may contain a GPS beacon that communicates to the portable computing device (ATAK) that will display the supply drop location in real time. However, in the event that the GPS beacon device is damaged during transport, the operators may use traditional navigational methods to reach the specified drop zone.

After supplies have been secured by the supported personnel, it is standard procedure to destroy any remaining items to prevent them from being repurposed by the enemy. The current process for the aforementioned JPADs is to burn any excess materials. In certain embodiments of the current system and method, an explosive, such as C-4 explosive may be prepackaged into the munition's remaining volume space. This design is beneficial because it is effective ballast that improves the missile's flight stability, it is coated in plastic bonded explosives (PBX), thus it is stable and has little chance of exploding in flight or landing, it is highly malleable so it can be shaped to fit any vacant space in the munition, as needed, and C-4 will only detonate when it is activated by a detonator. A 1.25 lb. charge of military-grade M112 C4 is sufficient to fully dispose of this delivery system and any remaining supplies.

EXEMPLARY EMBODIMENT

In one exemplary embodiment, the system 20 comprises a suite of wearable sensors 22 to detect the expenditure of supplies. These include the wearable tactical glove 32 with an audio sensor 34, an accelerometer 36, and a microcontroller 38 to collect data and transmit it to the portable computing device 24. The system 20 also includes biometric sensors to measure heart rate, temperature, respiration rate, oxygen consumption, galvanic skin response, and movement. A portable computing and communication device 24, such as the ANDROID™ Tactical Assault Kit collects sensor data, compiles it, and forwards it to a processor 26, such as at a base 12. At least one of the portable computing and communication device 24 and the processor 26 tracks expenditures, inventory, and predicts future needs based on rate of consumption and evaluates each operator's health and recommends nutrition or medical supplies. A precision delivery system 30 is provided to rapidly deliver the replacement supplies. In this embodiment, the delivery system 30 is a repurposed GBU-39A (small diameter bomb) with its energetic warhead removed and replaced with a plurality of resupply inserts 50 such as described above and shown in FIGS. 4-7C. The specific inserts 50 are selected based on the supplies needed by the operators and are loaded with the needed supplies. The inserts 50 can be made of 6061-T6 Aluminum, which can be cast or machined. The system 20 described here is optimized for the size and weight of the GBU-39A missile, but it could be applied to numerous other missile systems. If other missile systems are used, the specific insert designs would need revision to optimize the performance and loadout.

The system for asset inventory and urgent resupply can be made and used as follows. The system is made out of a collection of sensors, a microcontroller, packing inserts and an inert GBU-39A missile with parachute, as described above (see FIG. 1). The system may be used by combat operators in the field who wear or carry components of the system, such as sensors 22. Ammunition expenditure is tracked by wearable devices on each team member that can identify which type of round was fired. Biometric sensors may be used to track the health of the team members and suggest if medical supplies may be needed. This information is compiled by the portable computing device 24 to determine the total ammunition and/or medical resupply needs for the entire team. These data are pushed to the supporting personnel/systems at a forward operating base 12 who will anticipate the team's supply needs and plan to deliver the resupply with or without the team directly requesting it.

The needed supplies are loaded into the delivery system, an inert guided missile 30, which is loaded onto a strike aircraft and delivered in the manner of a traditional AGM strike. The delivery system 30 deploys a parachute 62 from the rear of the payload bay of the missile, which may occur at approximately 1,000 feet above ground level. The missile 30 will communicate its impact location to the portable communication device 24 so the team may locate it, or the team will navigate to the pre-determined aim point. Once the supplies are retrieved, the delivery system 30 may be destroyed by the included C-4 explosive.

There are numerous, non-limiting embodiments of the invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

Position lights could also be included on the missile shell 40 for night deliveries, similar to the red and green commercial aircraft marking lights. These lights can be programmed to extinguish upon delivery. A radio frequency remote control (similar to an RF car key) can be used to toggle lights or audible beacons on to help the recipients locate the delivery.

The system 20 may be used for the field of combat special operations in remote and/or hostile environments in which small teams are expected to operate with a minimal logistics "tail". The system 20 may also be used in other, similar fields in which people or machines are operating remotely, have limited ability to carry large stocks of supplies, and may require resupply of critical items. Possible alternate fields and users may include trans-oceanic sailors, wildland firefighting crews, mountain climbers, remotely operating scientific expeditions, autonomous robots operating in harsh or distant environments, space exploration with human or robotic explorers, etc.

The system described herein can provide a number of advantages. It should be understood, however, that these advantages need not be required unless they are set forth in the appended claims.

The system provides a comprehensive, integrated system of technologies and methods to intelligently track critical supplies and deliver replacement items just-in-time, such as through the use of reliable and highly accurate guided missiles. The system provides a long-range, accurate and timely delivery while leveraging existing technology (such as the Android™ Tactical Assault Kit (ATAK), the common launch tube (CLT)), and existing Air Force supply chains.

The system provides a means for remote operators to detect expenditure of critical supplies, track inventories for each team member and forward that data to supporting units who can prepare accurate and timely resupplies through the air such as with precision-guided missile(s). The system focuses on critical supplies such as firearm ammunition, medical supplies such as medicine and blood, batteries, radios, food, and water. Ammunition expenditure is tracked by wearable devices on each team member that can identify which type of round was fired. This information is compiled to determine the total ammunition resupply needs for the entire team. Biometric sensors are used to track the health of the team members and suggest if medical supplies may be needed. These data are pushed to the supporting personnel/systems who will anticipate the team's supply needs and plan to deliver the resupply with or without the team directly requesting it. Therefore, the system is anticipatory, or predictive. It requires minimal direct intervention on the part of the operating team, which is very beneficial because such teams are operating in highly stressful environments and may not have time or attention to direct toward supply logistics.

While previous devices have been proposed for counting rounds fired from weapons, the system is unique in that it collectively tracks usage for several team members, and includes an automatic system to compile a resupply delivery order. The resupply delivery method comprising a guided air-to-ground missile body (with the warhead removed), and the payload bay used to house the critical supply items leverages existing delivery methods, enabling easy adoption by the U.S. Air Force and exploits the precision guidance of the missile to ensure accurate timely delivery with minimal risk to the operating team. Using a pre-approved weapon system such as this (though not for the present purpose) will reduce development cost, improve accuracy, utilize existing logistics chains, reduce risk to delivery aircraft through an established standoff distance, and provide faster resupply than current methods. Because of the highly precise delivery, the operating team will not expend valuable time searching for or traversing to the final delivery location, or destroying excess supplies. In fact, in one possible embodiment, the missile includes a small C-4 explosive charge to self-destruct the missile and any remaining supplies, when desired by the operating team.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A system for asset inventory and resupply for supplying a group of individuals, wherein at least some of the individuals in the group are people who use different types of weapons that require different types of ammunition, said system comprising:

a plurality of sensors, each of which is configured to be associated with an individual, said sensors being configured to initially collect data that relate to the expenditure of supplies by the group of individuals, wherein:

the sensors collect data on the expenditure of at least one of the following types of supplies: firearm ammunition, medical supplies, batteries, radios, food, and water;

at least some of said sensors comprise gunshot detectors comprising at least one accelerometer and at least one microphone to count discharged rounds of ammunition and the types of rounds that are fired, wherein at least some of the gunshot detectors are joined to a wearable article that is configured for being worn on a wearer's hand or wrist as a glove or wrist watch, respectively; and at least some of the sensors are wearable and are configured to collect data on the wearer's vital signs which comprise at least one of the following: heart rate, temperature, respiration rate, movement, oxygen consumption, and galvanic skin response;

a portable computing and communication device for collecting and compiling sensor data in the locality of the sensors, wherein said portable computing and communication device is in wired or wireless communication with said sensors and said portable computing and communication device is configured to collect and compile data from the sensors, and wherein said communication device is also in communication with a processor, and after receiving sensor data from the sensors, said portable computing and communication device is configured to communicate the sensor data collected and compiled on the expenditure of supplies to the processor by satellite;

a processor that may be located at a base distant from said portable communication device, wherein at least one of said portable computing and communication device and said processor: tracks the expenditures of supplies by the group of individuals; determines the group's remaining inventory of supplies; and predicts the future supply needs based on the group's rate of inventory consumption including whether ammunition is needed based on the group's remaining ammunition and rate of expenditure of ammunition, and whether medical supplies are needed based upon the people's vital signs; and an inert guided missile without a warhead for delivering supplies to the group of individuals, wherein the system is configured so that when the group of individuals is determined to be in need of supplies, the processor alerts personnel at the base, supplies are gathered and loaded into the inert guided missile, and the inert guided missile is launched and travels to a drop zone near at least some individuals in the group of individuals.

2. The system of claim 1 wherein the sensors collect data on the expenditure of supplies without input from the individuals.

3. The system of claim 1 wherein some of the sensors are configured to collect data on the expenditure of one or more of the following types of medical supplies: blood, bandages, gauze, and combat tourniquets.

4. The system of claim 1 wherein the sensors that are configured to collect data on the wearer's vital signs are configured to collect data on at least one of the wearer's respiration rate, and oxygen consumption.

5. The system of claim 1 wherein at least one of the gunshot detectors is joined to a glove.

6. The system of claim 1 wherein the sensors collect data on the expenditures of one or more of the following types of supplies: batteries, radios, food, and water.

7. The system of claim 1 wherein the inert guided missile contains one or more inserts for transporting the supplies inside said missile.

8. The system of claim 7 wherein an insert comprises a generally cylindrical body having a longitudinal axis and one or more openings passing through said generally cylindrical body which openings are generally parallel to said longitudinal axis of said insert, and said openings provide a space for inserting supply items therein in a direction generally parallel to said longitudinal axis and retaining said supply items in said openings.

9. The system of claim 8 wherein said inserts have a plurality of openings therein, and walls between said openings, wherein said openings have a cross-sectional dimension and the walls have a width measured perpendicularly to said longitudinal axis, wherein the width of said walls is less than the cross-sectional dimension of said openings.

10. A method for supply inventory and resupply for a group of individuals in the field, wherein at least some of the individuals in the group are people who use different types of weapons that require different types of ammunition, said method comprising:

providing a group of individuals in the field with sensors configured to initially collect data that relate to the expenditure of supplies, wherein:

the sensors collect data on the expenditure of at least one of the following types of supplies: firearm ammunition, medical supplies, batteries, radios, food, and water;

at least some of said sensors comprise gunshot detectors comprising at least one accelerometer and at least one microphone to count discharged rounds of ammunition and the types of rounds that are fired; and at least some of the sensors are wearable by people and are configured to collect data on the wearer's vital signs which comprise at least one of the following: heart rate, temperature, respiration rate, movement, oxygen consumption, and galvanic skin response, wherein at least some of the sensors are joined to a wearable article that is configured for being worn on a wearer's hand or wrist as a glove or wrist watch, respectively;

providing a portable computing and communication device for collecting and compiling sensor data in the locality of the sensors, wherein said portable communication device is in wired or wireless communication with said sensors and said portable computing and communication device is configured to collect and compile data from the sensors, and wherein said communication device is also in communication with a processor at a base, and after receiving sensor data from the sensors, said portable computing and communication device is configured to communicate the sensor data collected and compiled on the expenditure of supplies to the processor by satellite;

collecting sensor data in the locality of the sensors using the portable computing and communication device;

providing a processor at a base distant from said portable communication device;

tracking the expenditures of supply by the group of individuals including whether ammunition is needed based on the group's remaining ammunition and rate of expenditure of ammunition, and whether medical supplies are needed based upon the people's vital signs using at least one of said portable computing and communication device and said processor;

determining the group's remaining inventory of supplies using at least one of said portable computing and communication device and said processor;

predicting the future supply needs based on the group's rate of inventory consumption using at least one of said portable computing and communication device and said processor; and using an inert guided missile without a warhead to deliver the supplies to the group of individuals in the field, wherein the system is configured so that when the group of individuals is determined to be in need of supplies, the processor alerts personnel at the base, supplies are gathered and loaded into the inert guided missile, and the inert guided missile is launched and travels to a drop zone near at least some individuals in the group of individuals.

11. The method of claim 10 wherein the sensors that are configured to collect data on the wearer's vital signs are configured to collect data on at least one of the wearer's respiration rate and oxygen consumption.

12. The method of claim 10 wherein the individuals in the group are people, and the at least one of the portable computing and communication device and the processor determines the resupply needs of the group of people without the group of people requesting supplies.

13. The method of claim 10 wherein the inert guided missile contains one or more inserts for transporting the supplies inside said missile.

* * * * *